Feb. 2, 1960

G. A. LARSON 2,923,096

GLASS LOCATOR

Filed Oct. 4, 1957

INVENTOR
GILBERT A. LARSON

BY Michael Hertz

ATTORNEY

Feb. 2, 1960　　　　　G. A. LARSON　　　　　2,923,096
GLASS LOCATOR
Filed Oct. 4, 1957　　　　　　　　　　　　3 Sheets-Sheet 2

INVENTOR
GILBERT A. LARSON
BY Michael Hertz
ATTORNEY

Feb. 2, 1960

G. A. LARSON 2,923,096

GLASS LOCATOR

Filed Oct. 4, 1957

INVENTOR
GILBERT A. LARSON

BY Michael Hertz

ATTORNEY

United States Patent Office 2,923,096
Patented Feb. 2, 1960

2,923,096

GLASS LOCATOR

Gilbert A. Larson, Emporium, Pa., assignor, by mesne assignments, to Sylvania Electric Products Inc., Wilmington, Del., a corporation of Delaware Application October 4, 1957, Serial No. 688,287

7 Claims. (Cl. 49—1)

This invention relates to a glass locator on a machine for locating the top of a glass cylinder at a fixed reference level.

The invention is particularly useful in the electronics industry in conjunction with machines for sealing electrode terminals into the glass and wherein the mechanism of the machine raises an electrode terminal into correct sealing position axially of the cylinder and at a predetermined level relative to the top of the cylinder. In such a machine the top portion of the cylinder is fused in toward and around the electrode to form a dome on the cylinder through which the electrode terminal extends. The glass cylinders may and often do vary somewhat in height, wherefore a fixed bottoming stop for the cylinders will not suffice to maintain proper elevation of the top of the cylinder with respect to the electrode terminal. In acordance with this invention, means are provided to adjust the top of the cylinders to a predetermined and fixed level. Furthermore, to secure better and more uniform sealing in of the glass to the electrode terminal, efficient means are provided to secure axial centering of the glass cylinder with respect to the support, both at the bottom and top of the cylinder.

It is therefore, an object of the invention to provide means for securing proper positioning of the top of a glass member.

It is a further object of the invention to provide means for accurately centering a cylinder with respect to another member to which the top portion of the cylinder is to be joined.

These and other objects will be made evident upon consideration of the following specification, when taken in conjunction with the accompanying drawings in which.

Figure 8:
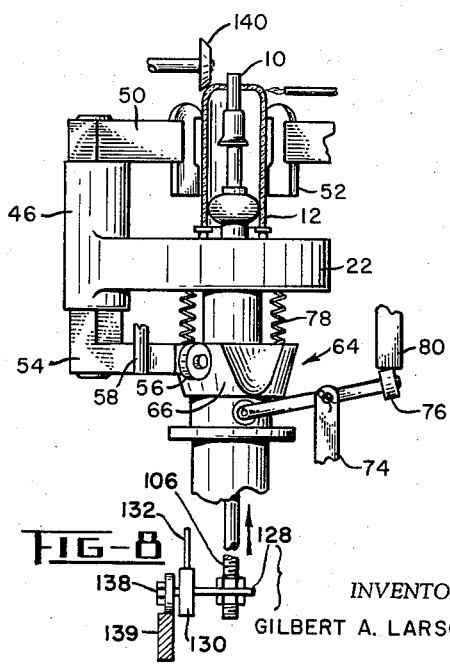

Referring to the drawings with greater particularity, the invention is illustrated as applied to the manufacture of a high voltage diode rectifier as a type 1B3 tube having an anode terminal as 10, Fig. 8, sealed to the glass cylinder 12.

Figures 1, 2, 9:
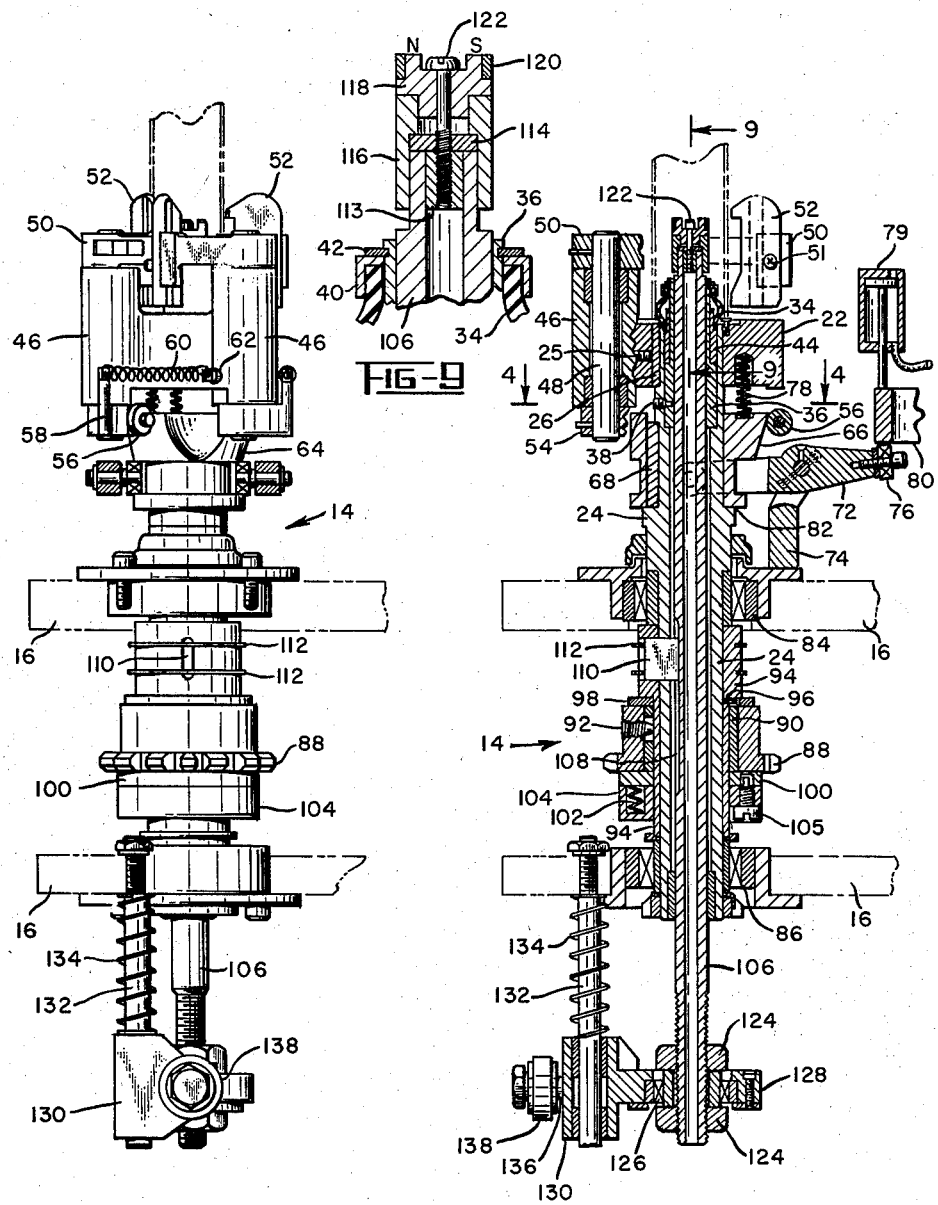
Fig. 1 is a view, in elevation, of a portion of a machine embodying the invention.
Fig. 2 is a vertical cross section through the structure of Fig. 1.
Fig. 8 is a similar view showing the association of the sealed in electrode terminal with the glass bulb and Fig. 9 is an enlarged view of the top portion of Fig. 2.
Figure 3:
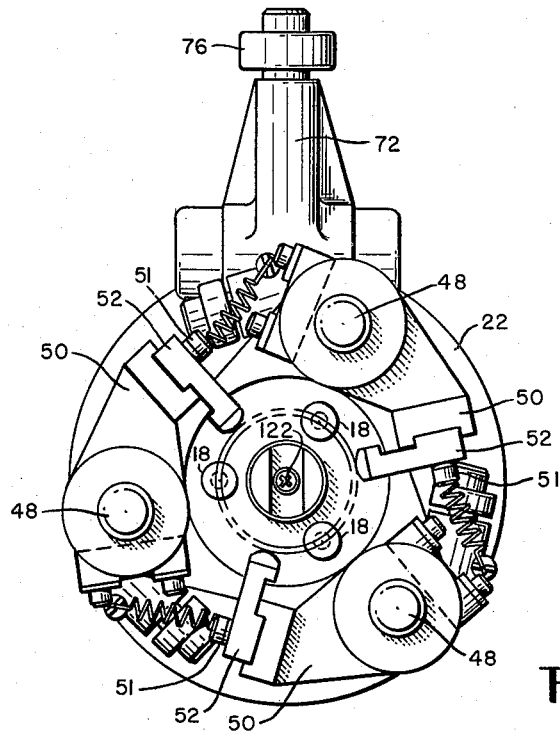
Fig. 3 is a plan view of the structure of Fig. 1.
Figure 4:
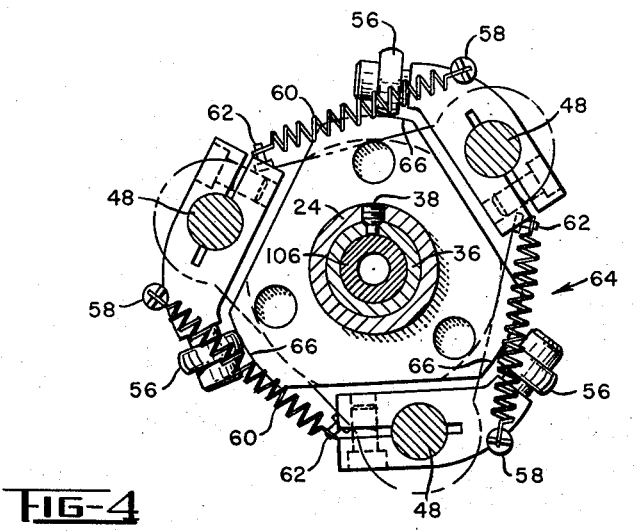
Fig. 4 is a section on the line 4—4 of Fig. 2.

The mechanism for centering and positioning the cylinder and anode terminal with respect to each other is associated with spindles indicated generally at 14, Figs. 1 and 2, mounted in supports 16. The supports are parts of an indexible turret with the spindles arranged circumferentially thereabout and equally spaced from each other. During one halt between turret indexing the glass cylinder is subjected to a centering and height adjusting operation and clamped in adjusted position, and at other pauses in turret rotation the spindle is rotated with fires directed at the upper end of the glass cylinder to fuse the same about the terminal. Since the mechanism for indexing the turret forms no part of this invention, nor the cam means for controlling valves, etc. it is unnecessary to further describe the same.

Figure 5:
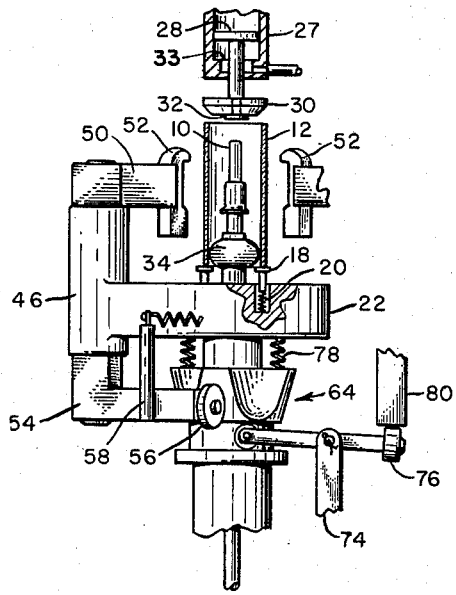
Fig. 5 is a fragmentary view of the cylinder locating mechanism, with the cylinder shown in section and as parts would appear subsequent to cylinder emplacement on its support and prior to centering action of a cone button at the top of the cylinder and depression of the level of the top of the cylinder.
Figure 6:
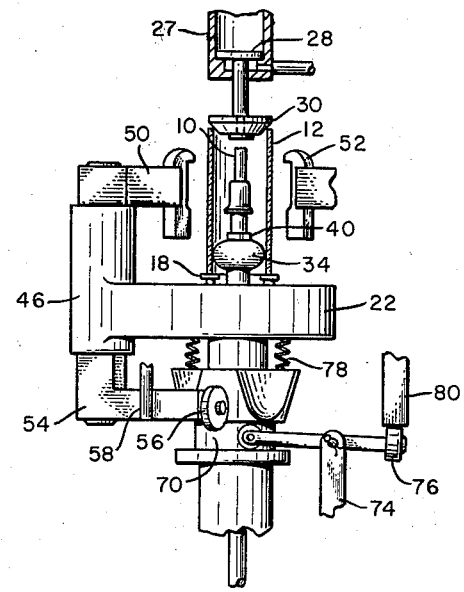
Fig. 6 is a similar view showing the parts subsequent to cylinder centering and top elevation positioning.

At one indexed position of the turret, the operator places a glass cylinder 12, see Fig. 5 upon the spindle. The support for the cylinder is in the form of three metallic stem mounted pressure pads 18 on which the lower periphery of the cylinder rests. These pads are urged upwardly by springs 20 supported by a jaw support in the form of a collar 22. The collar is seated on a shoulder on the upper end of a sleeve 24, see particularly Fig. 2, and held fast to the sleeve by a pin 25 at the upper end of the sleeves screwed into collar 22 and bearing against a thrust plate 26 interposed between the screw and the planar portion at the upper end of sleeve 24. At the cylinder locator position of the indexed turret, and illustrated in Figs. 5 and 6, there is provided a double acting fluid motor having a cylinder 27 vertically adjustable with reference to the frame and a piston 28 therein. The lower end of the piston has a pusher in the form of a cone shaped centering or locator button 30 rotatably mounted thereon as by being rotatably mounted on a reduced in diameter portion of the piston rod with a wide headed bolt 32 screwed into the end of the rod to hold the button in place. When fluid pressure is admitted to the cylinder above the piston, the piston moves all the way down to the bottom 33 of the cylinder which bottom acts as a stop, and the button forces the cylinder 12 down compressing the springs 20. The tops of all of the cylinders, irrespective of height variation, will therefore all be set to the same level. After clamping a cylinder in place, as will be explained, the piston is driven upward to permit indexing movement of the spindles and clearance of the glass cylinders below the button.

While the cylinder is held at the proper level by the locator button, the bottom of the cylinder is located laterally by reason of a resilient fabric bag 34 made of neoprene, rubberized fabric or the like. This bag, see Fig. 9, is in the form of a resilient toroid fastened at its upper end to a bronze bushing 36 which bushing is held by a dog point set screw 38, Fig. 2, to the sleeve 24. As shown, the upper end of the bag is clamped between the skirt of a cup-washer 40 and the bushing, the washer being held in place by a snap ring 42 engaging a groove in the upper portion of the bushing. The lower end of the bag is held in between a stepped bushing 44 surrounding the bushing 36 and a thinned upper portion of sleeve 24.

The collar 22 has integral therewith three upstanding bearings 46 bushed at their ends and spaced 120 degrees around the collar. These bearings receive pivot pins 48 on the upper ends of each of which is fixedly mounted a clamping jaw supporting arm 50 to which is fastened, as by screw 51, the cylinder engaging jaw 52. To the lower end of pin 48 is secured an angled actuating arm 54 having a cam actuated roller 56 at its free end and an upstanding projection 58, see Figs. 1 and 5, on an intermediate portion of the arm 54. A spring 60 is stretched between the perforated upper end of the projection and a perforated stud 62 on the next adjacent bearing 46. The spring tends to press its associated roller 56 against a vertically reciprocatable conoid 64 provided with three conical faces 66 spaced 120 degrees apart, the intermediate portions being cut away to provide for clearance of parts. To prevent the conoid from rotating about the sleeve 24, see Fig. 2, a portion of the sleeve is flattened, as is the opposing inner surface of the conoid and a flat wear plate 68 is interposed between the two flat surfaces. To shift the conoid longitudinally of the sleeve, the conoid is provided with a circumferential groove 70, indicated in Fig. 6, in which rides the anti-friction rollers of a forked lever 72, Fig. 2, pivoted on a forked post 74 extending up from the support. The free end of the lever is provided with an anti-friction roller 76 adapted to ride under a stationary cam track, which track is supported by the machine and extends concentrically with the array of spindles. The function of the cam track is to effect raising and permit lowering of the conoid by cooperation with the roller 76. During movement of the turret and spindle from a position where the associated bulb and electrode terminal are removed from the spindle to the cylinder locating position, the jaws 52 are maintained open because the conoid is in raised position with the roller maintained depressed by reason of engagement of the same with the under surface of the stationary cam track. At other positions of the spindle, save for the locator position, the absence of a cam track allows the conoid to drop, therefore causing the rollers 56 to force the jaws to cylinder holding position. This action is assisted by 120 degree apart springs 78 interposed between the conoid and the collar 22.

Figure 7:
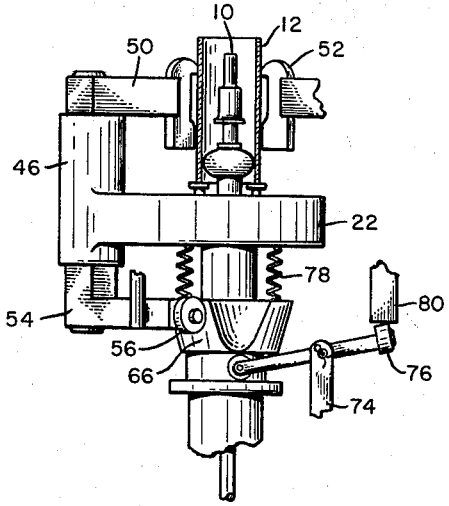
Fig. 7 is a similar view showing the cylinder maintained in proper adjusted position by external clamp jaws, the locator cone button being withdrawn.

At the locator station there is a cam track section 80 which is vertically movable. Normally the track section 80 is depressed and the lower surface thereof is in alignment with the adjacent surface of the stationary cam track; therefore, the spindle moves from a cylinder loading position to a cylinder locating position with the roller 76 kept depressed and the jaws 52 maintained open. After the glass cylinder has been properly located by action of the bag 34 and the locator button 30, a motor 79, Fig. 2, whose valve is under control of a cam on the machine elevates the track section 80, allowing the springs 78 and gravity to function to lower the conoid 64 and close the jaws 52 on the cylinder. Then cams on the machine control the operation of valves to the locator motor 27 to cause the button 30 to rise to allow unrestricted indexing motion of the glass cylinder by action of the machine. The jaws 52 remain closed because of the absence of cam track above the roller 76 and because of the action of the cone 64 in its down position, see Figs. 7 and 8, on the arms 54 until the spindle is near the unloading position. Just before the spindle arrives at this position its associated roller engages the above referred to stationary cam track section. The track section 80 is lowered soon after the located cylinder spindle departs. The downward movement of the conoid is limited by engagement of the lower surface of the conoid with a shoulder 82, Fig. 2, on the sleeve 24.

The spindle 14, see Fig. 2, is rotatably mounted in spaced bearings 84 and 86 in the supports 16, these bearings being conventional ball bearings. Each of the spindles is provided with a sprocket 88 adapted to be engaged by a sprocket chain wrapped around all of the sprockets and driven by a motor. The sprocket is internally lined with a bushing 90 held to the sprocket by a set screw 92 passing through the hub of the sprocket, the bushing being rotatable on a spacer sleeve 94 interposed between the two bearings. A pin 96 is set into a hole in the sleeve 94, the pin lying in a slot in a ring 98 to prevent ring rotation relative to the spacer sleeve 94. A slip drive connection is thus attained between the sprocket and ring but none between the ring and spacer sleeve 94. Another friction ring 100 is placed against the lower face of sprocket 88, and the sprocket and two friction rings are pressed together by three 120° spaced apart springs 102 located in recesses in a collar 104 clamped on the spacer sleeve in any conventional fashion. In order to prevent rotation of the ring 100 relative to the collar and spacer sleeve, a dog point screw 105 is threaded into the collar 104 with the reduced in diameter unthreaded portion of the screw entering a hole in the ring 100. Vertically slidable within bearings in the sleeve is a hollow rod 106. This rod has a splined portion 108 between the bearings, cooperating with a spline 110 passing through the spacer sleeve 94, sleeve 24 and into the splined portion of rod 106 and held in place by a pair of spring snap rings 112 lying in grooves in the spacer sleeve 94 and spanning the spline.

Means are provided at the upper end of rod 106 to temporarily hold the metal electrode 10 in place. Within the top of the hollow rod 106, see Fig. 9, is fastened an internally threaded sleeve 113. Atop this sleeve and the rod is a brass washer 114. The top of the rod is reduced in external diameter and surrounding the so reduced rod portion is an internally shouldered brass ring 116. Seated within the top portion of the ring is a permanent magnet 118 having poles as indicated, and surrounding the magnet adjacent the poles is a brass ring 120. A screw 122 passes through a hole in the magnet and the washer 114 and is screwed into the sleeve 113 and holds the parts in place. The magnet is designed to temporarily attract and hold the electrode and its terminal while it is moved to upper position of the rod 106 and while it is to be fused into the cylinder. The terminal is usually made at its upper portion of a magnetic material such as an iron-chrome alloy and will be held to the magnet.

The rod 106, Fig. 2, is also provided with an externally threaded lower end on which is adjustably positioned a pair of lock nuts 124 clamping between them the ball bearing 126 fixed in an arm 128, the arm being provided with a bushed sleeve 130 slidable on a rod 132 extending down from the lower support 16. A helical spring 134 coiled about the rod tends to force the sleeve, and therefore the rod 106, to the position shown in Fig. 2. The sleeve 130 is provided with an axle 136 on which is rotatably mounted a cam roller 138. The roller is adapted, at a time when the rod is to be elevated, to engage the upper surface of a stationary cam track 139, Fig. 8, concentric with the axis of rotation of the turret, to raise the electrode mounted about the magnet to a predetermined height relative to the collar 22. Since the top of the glass cylinder has already been depressed to a predetermined height above the collar 22, the electrode and top of the glass cylinder are always brought to proper levels so that effective seating of the glass about electrode terminals may be effected.

In operation, the spindle is set into operation by starting the machine. After an electrode had been placed about the magnet 118 and a glass cylinder had been placed on the three pads 18 and about the bag 34, the turret is machine indexed to bring the loaded spindle beneath the button 30. The turret is now momentarily arrested while a cam on the machine operates valves to apply fluid pressure to the piston 28 in cylinder 27 to drive the button into engagement with the top of the cylinder, center it, and depress it to a predetermined level, against the action of the resiliently supported pads 18. The lower limit of motion of the button is determined by any suitable means, that here shown being the piston coming into engagement with the lower cylinder wall 33.

After the glass cylinder has thus been centered and adjusted vertically, fluid pressure is admitted to the undersurface of the piston in motor 79 by means of a cam on the machine controlling a valve and the track section 80 is elevated releasing the lever 72 so that it may swing counterclockwise in Fig. 2, the springs 78 and gravity then moving the conoid 64 downwardly of the spindle, thereby forcing the rollers 56 outwardly from the spindle. This action oscillates the pins 48 and brings the clamp jaws 52 into engagement with the exterior of the glass cylinder with sufficient force to maintain the cylinder in its adjusted position and against upward movement. A cam on the machine next operates valves to lift the piston 28 and then the turret indexes to bring the glass cylinder to various stations. Toward the end of each indexing movement, the cam controlled valve for cylinder 79 releases the fluid pressure in the motor allowing the track section 80 to drop preparatory to the next cylinder being positioned between the jaws 52. At stations subsequent to the locating station, fires are played on the upper portion of the glass and rollers, such as roller 140 in Fig. 8, bear thereagainst to shape the top of the glass into a dome. When by this action the hole in the upper portion of the cylinder has been almost wholly closed, the roller 138 on the sleeve 136 adjacent the lower end of the rod 106 engages the upper face of a stationary cam track and, by movement of the turret, the rod 106 is quickly raised forcing the electrode terminal carried about the magnet to push aside the glass of the dome forming the walls of the hole and move into the hole. Further heating during subsequent pauses in the indexing movement of the turret while the spindle is rotating seals the glass in the dome securely to the terminal. After such sealing action, the cam track contour recedes beneath roller 138, allowing the rod 106 to fall. The magnet 118 is of sufficient strength to prevent accidental displacement of the terminal, but will not interfere with leaving the terminal in place in the dome once the glass has flowed thereabout. The track beneath roller 138 need only extend sufficiently to maintain the rod 106 elevated for insertion of the electrode in the glass dome and its retention therein.

As the turret indexes a spindle to unloading position of the formed bulb, the roller 76 rides along and downwardly on the downwardly facing stationary cam track, effecting opening of the jaws 52. The dome cylinder, with sealed-in anode, may now be removed. The spindle now indexes to the loading station, then to the locating station. The roller 76 keeps on riding from under the stationary track to under the now lowered track section 80 ready for subsequent raising of the track, after cylinder adjustment, and also ready for closing of the jaws, and repetition of the cycle.

What is claimed as new is:

1. A cylinder locator comprising, a jaw support mounted to rotate at a fixed elevation, resiliently supported depressible pressure pads mounted on the upper surface of said support adapted to engage the lower edge of a hollow cylinder, a vertically movable pusher above the support having a button adapted to engage the top edge of said cylinder, a fixed stop in the path of movement of a part movable with the pusher to limit the downward motion of the pusher, jaws mounted on the support engageable with the outer wall of said cylinder, means operative to move the pusher down onto the top edge of the cylinder, depressing the same against the action of the pads and until the motion of the pusher is halted by the stop, said means being also operative to raise the pusher, means to operate the jaws to grasp the cylinder, a vertically reciprocatable rod axially aligned with the button, means at the top of said rod to support an element to be sealed in with the top of said cylinder, when the rod is at the upper limit of its excursion, and means to reciprocate the rod.

2. A cylinder locator comprising, a jaw support mounted to rotate at a fixed elevation, resiliently supported depressible pressure pads mounted on the upper surface of said support adapted to engage the lower edge of a hollow cylinder, a member on the support engageable with the interior wall of the cylinder, near the bottom edge of the cylinder, a vertically movable pusher above the support having a button adapted to engage the top edge of said cylinder, a fixed stop in the path of movement of a part movable with the pusher to limit the downward motion of the pusher, jaws mounted on the support engageable with the outer wall of said cylinder, means operative to move the pusher down onto the top edge of the cylinder, depressing the same against the action of the pads and until the motion of the pusher is halted by the stop, said means being also operative to raise the pusher, means to operate the jaws to grasp the cylinder, a vertically reciprocatable rod axially aligned with the button, means at the top of said rod to support an element to be sealed in with the top of said cylinder when the rod is at its upper limit of its excursion, and means to reciprocate the rod.

3. A cylinder locator comprising, a jaw support mounted to rotate at a fixed elevation, resiliently supported depressible pressure pads mounted on the upper surface of said support adapted to engage the lower edge of a hollow cylinder, a vertically movable pusher above the support having a button with a conical portion adapted to engage the top edge of said cylinder to center the top of said cylinder with respect to the button, a fixed stop in the path of movement of a part movable with the pusher to limit the downward motion of the pusher, jaws mounted on the support engageable with the outer wall of said cylinder, means operative to move the conical portion down into the top of the cylinder, depressing the cylinder against the action of the pads and until the motion of the pusher is halted by the stop, said means being also operative to raise the pusher, means to operate the jaws to grasp the cylinder, a vertically reciprocatable rod axially aligned with the button, means at the top of said rod to support an element to be sealed in with the top of said cylinder when the rod is at the upper limit of its excursion, and means to reciprocate the rod.

4. A cylinder locator comprising, a jaw support mounted to rotate at a fixed elevation, resiliently supported depressible pressure pads mounted on the upper surface of said support adapted to engage the lower edge of a hollow cylinder, a member on the support engageable with the interior wall of the cylinder, near the bottom edge of the cylinder, a vertically movable pusher above the support having a button with a conical portion adapted to engage the top edge of said cylinder to center the top of said cylinder with respect to the button, a fixed stop in the path of movement of a part movable with the pusher to limit the downward motion of the pusher, jaws mounted on the support engageable with the walls of said cylinder, means operative to move the conical portion down into the top of the cylinder, depressing the same against the action of the pads and until the motion of the pusher is halted by the stop, said means being also operative to raise the pusher, means to operate the jaws to grasp the cylinder, a vertically reciprocatable rod axially aligned with the button, means at the top of said rod to support an element to be sealed in with the top of said cylinder when the rod is at the upper limit of its excursion, and means to reciprocate the rod.

5. A cylinder locator comprising, a jaw support mounted to rotate at a fixed elevation, resiliently supported depressible pressure pads mounted on the upper surface of said support adapted to engage the lower edge of a hollow cylinder, a member on the support engageable with the interior wall of the cylinder, near the bottom edge of the cylinder, a vertically movable pusher above the support having a button adapted to engage the top edge of said cylinder, a fixed stop in the path of movement of a part movable with the pusher to limit the downward motion of the pusher, jaws mounted on the support engageable with the outer wall of said cylinder, means to move the jaws comprising a cam follower connected to each jaw, a vertically shiftable conoid engaging the followers, a lever one end of which engages the conoid to shift the same, spring means reacting between the jaw support and the conoid acting in opposition to the action of the lever, a vertically shiftable track engaging the other end of the lever, means operative to move the pusher down onto the top edge of the cylinder, depressing the same against the action of the pads and until the motion of the pusher is halted by the stop, said means being also operative to raise the pusher, means to lift the track to enable the jaws to grasp the cylinder, a vertically reciprocatable rod axially aligned with the button, means at the top of said rod to support an element to be sealed in with the top of said cylinder when the rod is at the upper limit of its excursion and means to reciprocate the rod.

6. A cylinder locator comprising, a jaw support mounted to rotate at a fixed elevation, resiliently supported depressible pressure pads mounted on the upper surface of said support adapted to engage the lower edge of a hollow cylinder, a vertically movable pusher above the support having a button adapted to engage the top edge of said cylinder, a fixed stop in the path of movement of a part movable with the pusher to limit the downward motion of the pusher, jaws mounted on the support engageable with the outer wall of said cylinder, means operative to move the pusher down onto the top edge of the cylinder, depressing the same against the motion of the pads and until the motion of the pusher is halted by the stop, said means being also operative to raise the pusher, means to operate the jaws to grasp the cylinder, a vertically reciprocatable rod axially aligned with the button, magnetic means at the top of said rod to support an element to be sealed in with the top of said cylinder when the rod is at the upper limit of its excursion, and means to reciprocate the rod.

7. A cylinder locator comprising, a jaw support mounted to rotate at a fixed elevation, resiliently supported depressible pressure pads mounted on the upper surface of said support adapted to engage the lower edge of a hollow cylinder, a resilient member on the support engageable with the interior wall of the cylinder, near the bottom of the cylinder, a vertically movable pusher above the support having a button adapted to engage the top edge of said cylinder, a fixed stop in the path of movement of a part movable with the pusher to limit the downward motion of the pusher, jaws mounted on the support engageable with the outer wall of said cylinder, means operative to move the pusher down onto the top edge of the cylinder, depressing the same against the action of the pads and until the motion of the pusher is halted by the stop, said means being also operative to raise the pusher, means to operate the jaws to grasp the cylinder, a vertically reciprocatable rod axially aligned with the button, means at the top of said rod to support an element to be sealed in with the top of said cylinder when the rod is at its upper limit of the excursion, and means to reciprocate the rod.

References Cited in the file of this patent

UNITED STATES PATENTS

| Number | Name | Date |
|---|---|---|
| Re. 13,339 | Dorman | Dec. 12, 1911 |
| 396,988 | Daly | Jan. 29, 1889 |
| 2,185,704 | Donovan et al. | Jan. 2, 1940 |
| 2,203,917 | Malloy | June 11, 1940 |
| 2,312,003 | Schneider et al. | Feb. 23, 1943 |
| 2,447,569 | Eisler | Aug. 24, 1948 |
| 2,565,126 | Flaws | Aug. 21, 1951 |
| 2,685,762 | Mullan | Aug. 10, 1954 |
| 2,715,298 | Buttino | Aug. 16, 1955 |
| 2,784,357 | Sangster | Mar. 5, 1957 |
| 2,813,374 | Bouwman et al. | Nov. 19, 1957 |